United States Patent
Narayan et al.

(10) Patent No.: US 7,361,727 B2
(45) Date of Patent: Apr. 22, 2008

(54) COPOLYMERIZATION OF 1,4-DIOXAN-2-ONE AND A CYCLIC ESTER MONOMER PRODUCING THERMAL STABILIZED 1,4-DIOXAN-2-ONE (CO)POLYMERS

(75) Inventors: Ramani Narayan, Okemos, MI (US); Jean-Marie Raquez, Mons (BE); Sunder Balakrishnan, East Lansing, MI (US); Philippe Dubois, Ciplet (BE); Philippe Degee, Hautrage (BE)

(73) Assignee: Board of Trustees of Michigan State University, East Lansing, MI (US)

( * ) Notice: Subject to any disclaimer, the term of this patent is extended or adjusted under 35 U.S.C. 154(b) by 179 days.

(21) Appl. No.: 11/199,536

(22) Filed: Aug. 8, 2005

(65) Prior Publication Data

US 2006/0036060 A1    Feb. 16, 2006

Related U.S. Application Data

(60) Provisional application No. 60/600,077, filed on Aug. 9, 2004.

(51) Int. Cl.
*C08G 63/78* (2006.01)

(52) U.S. Cl. .............. 528/274; 521/182; 521/916; 524/306; 524/310; 525/306; 525/310; 525/437; 528/182; 528/188; 528/354; 549/274; 549/349

(58) Field of Classification Search ............... 521/182, 521/916; 524/306, 310; 525/437; 528/182, 528/188, 354; 549/274, 349
See application file for complete search history.

(56) References Cited

U.S. PATENT DOCUMENTS 5,556,895 A * 9/1996 Lipinsky et al. ............ 521/182

* cited by examiner

*Primary Examiner*—Terressa Boykin
(74) *Attorney, Agent, or Firm*—Ian C. McLeod

(57) ABSTRACT

A polymerization process to derive a thermal-stabilized poly(1,4-dioxan-2-one) and cyclic ester monomer copolymer using a coordination-insertion catalyst/initiator. 1,4-dioxan-2-one and cyclic ester monomer, each containing less than 100-ppm water and having an acid value less than 0.5 mg KOH/g, and preferably less than 0.2 mg KOH/g, are copolymerized. Preferably the cyclic ester monomer is ε-caprolactone and the reaction is in an extruder.

20 Claims, 3 Drawing Sheets

Screw configuration

Figure 1: Screw configuration
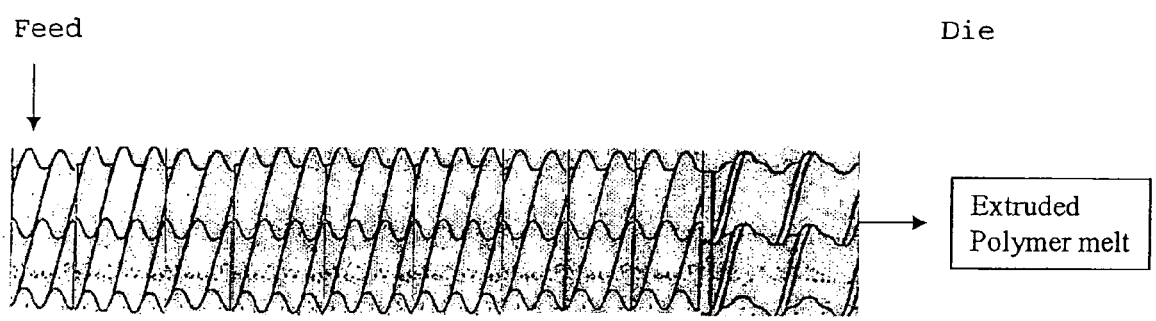

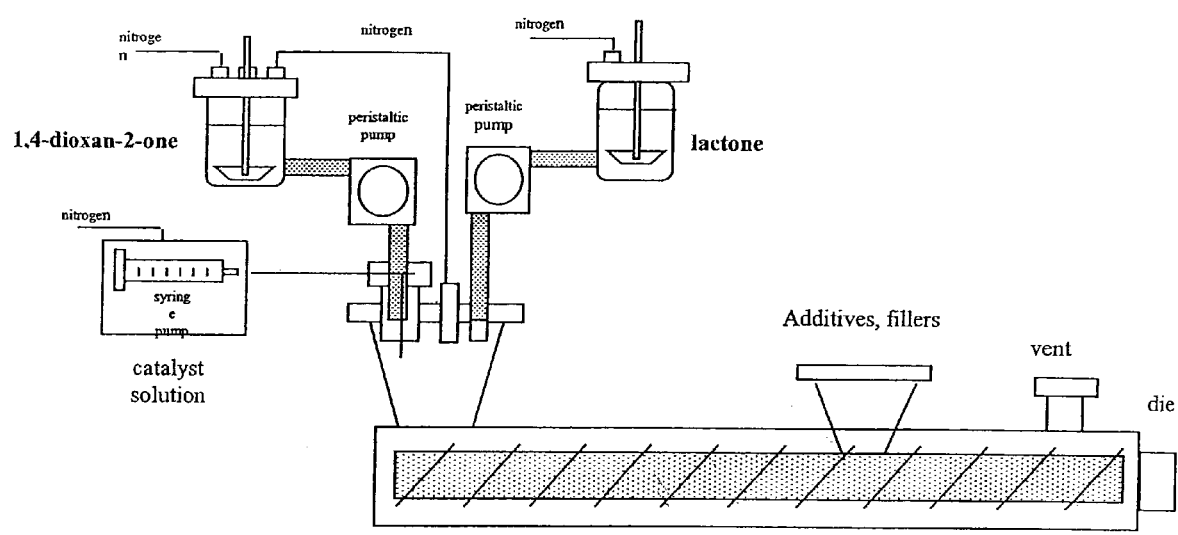
Figure 2: Extruder

Figure 3: Drying setup
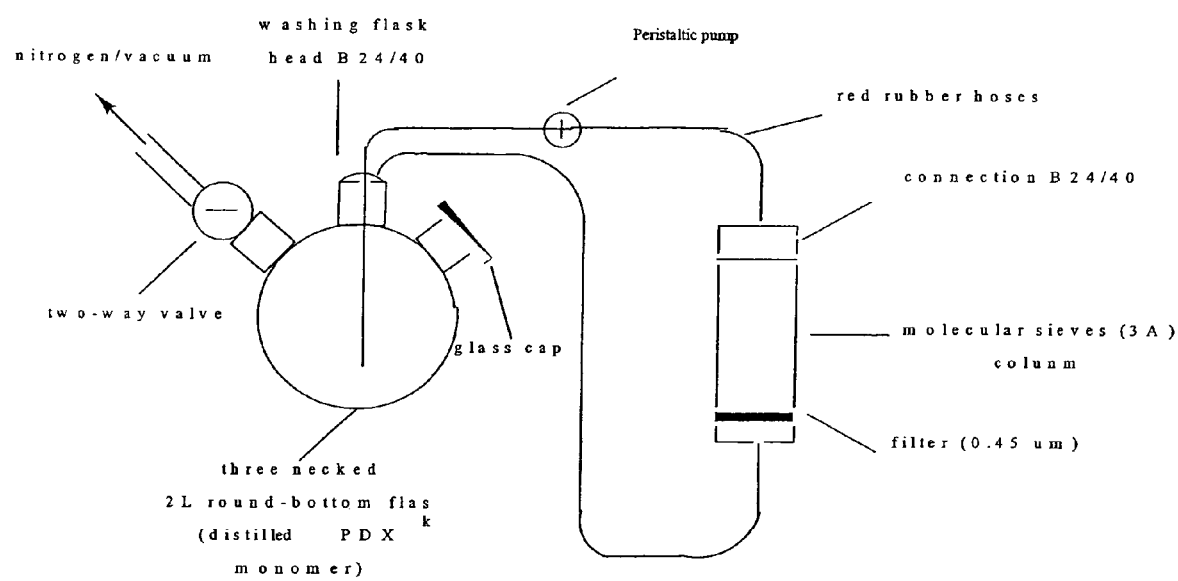

COPOLYMERIZATION OF 1,4-DIOXAN-2-ONE AND A CYCLIC ESTER MONOMER PRODUCING THERMAL STABILIZED 1,4-DIOXAN-2-ONE (CO)POLYMERS

CROSS REFERENCE TO RELATED APPLICATION

This application claims priority to Provisional Application Ser. No. 60/600,077, filed Aug. 9, 2004.

STATEMENT REGARDING FEDERALLY SPONSORED RESEARCH OR DEVELOPMENT

None

STATEMENT REGARDING GOVERNMENT RIGHTS

None

BACKGROUND OF THE INVENTION (1) Field of the Invention

The present invention relates to the preparation of poly (1,4-dioxan-2-one) as a copolymer with a cyclic ester in a melt. In particular, the present invention relates to a reactive extrusion process for bulk copolymerization of 1,4-dioxan-2-one and the cyclic ester using an organometallic polymerization agent (catalyst or initiator), particularly a coordination insertion catalyst, to form a polymer with a high molecular weight with good control over molecular weight. In particular, the present invention relates to a reactive extrusion process for bulk copolymerization of 1,4-dioxan-2-one copolymerized with a limited amount of comonomer which is the cyclic ester, particularly a lactone or dilactone, using a coordination-insertion agent, to form an aliphatic copolyester with good control over molecular weights and conversion, and with improved thermal properties for use as biodegradable plastics.

More specifically, the present invention relates to a continuous extrusion polymerization process of 1,4-dioxan-2-one and the cyclic ester to produce high molecular weights at high throughputs. The present invention also relates to a continuous extrusion polymerization process of 1,4-dioxan-2-one copolymerized with a limited amount of the cyclic ester to produce high molecular weight aliphatic copolyester with fraction of the cyclic ester in the polymer of than 5 wt %, preferably 3 wt %, at high throughputs. The present invention also relates to the manufacture of semi-crystalline poly(1,4-dioxan-2-one) copolymer with improved thermal properties and thermal stability. The present invention also relates to compositions derived by reactive extrusion polymerization process, which are useful in making biodegradable articles and specially related to a unique intermediate that exhibits branching.

(2) Description of the Related Art 1,4-Dioxan-2-one is known to be polymerized readily in bulk (absence of any solvent) using organometallic or enzymatic catalysis such as tin (II) bis (2-ethylhexanoic acid), diethylzinc, triethylaluminium, Zn lactate and derivatives of Ti, Zr and Hg (Snapp, H. et al. U.S. Pat. No. 3,645,941, Bezwada, R. et al. U.S. Pat. No. 4,643,191, Schultz, H. U.S. Pat. No. 3,063,967, Bagget, J. et al. U.S. Pat. No. 3,391,126, Doddi, N. et al. U.S. Pat. No. 4,032,988, Kricheldorf, H. Macromol. Symp. 130: 393 (1998), Nishida, H. at al. J. Polymer Science: Part A: Polymer Chemistry 38: 1560 (2000)). However, as a result of the dynamic chemical equilibrium between 1,4-dioxan-2-one (PDX) and poly(1,4-dioxan-2-one) above the melting point of the polymer, conversion of monomer is typically limited to about 78%. Removal or recovery of unreacted monomer from the melt is difficult because of the tendency, given this dynamic equilibrium, of the polymer to depolymerize or lose molecular weight as the monomer is removed to maintain the equilibrium monomer content.

U.S. Pat. No. 5,717,059 describes a method for removing the PDX monomer from previously solidified polymerizing mixture without any adverse degradation reactions to form high molecular weight polymers. However, the time for removing the unreacted monomer from the polymerizing mixture was on the order of hours. The process used to manufacture high molecular weight 1,4-dioxan-2-one polymers is extremely time-consuming and cost-expensive.

Thermal stabilized poly(1,4-dioxan-2-one) polymers have also been prepared by end-capping the extremity of poly(1,4-dioxan-2-one) in the melt. However, after end-capping of the poly(1,4-dioxan-2-one) extremity by a chemical agent such as pyromellitic anhydride, the reacting mixture still contains a large amount of unreacted monomer, which has to be removed from poly(1,4-dioxan-2-one) and recycled, making the process economically unattractive (U.S. Pat. No. 5,652,331).

To permit commercial scale-up of the polymerization without adversely affecting process economics, it is necessary to provide an appropriate, inexpensive and easy process to manufacture thermal stabilized poly(1,4-dioxan-2-one) with conversion close to completion as well as a corresponding process for manufacturing it in order to achieve an inexpensive and integrated production with high volumes.

It is highly desirable to carry out the polymerization reaction in the melt rather than in solution for environmental concern and unfavorable economics related to the use of organic solvents. Further, bulk polymerization can be conducted in extruders, making it a continuous process. Polystyrenes and nylons have been produced commercially by polymerization in an extruder. A number of patents have evolved in the extrusion of these polymers; the process schematics and screw configurations vary considerably. The extruder screw configuration can improve yield, molecular weight, molecular weight distribution and product throughput.

Reactive extrusion is an attractive route for polymer processing in order to carry out various reactions including polymerization, grafting, branching and functionalization. Reactive extrusion polymerization involves polymerizing a liquid/solid monomer or pre-polymer within the residence time available in the extruder to form a high molecular weight melt.

The prior art has shown that extruders can be used for bulk polymerizations of monomers like methylmethacrylate, styrene, lactam, ε-caprolactone and lactide (Michaeli, W. et al., J. of Appl. Polymer Sci. 48:871-886 (1993); Kye, H., et at., J. of Appl. Polymer Sci. 52:1249-1262 (1994), U.S. Pat. Nos. 5,412,005 and 5,906,783). The economics of using the extruder for bulk polymerization are favorable when high throughputs and control of molecular weight are realized.

Low cost production and processing methods for biodegradable plastics are of great importance since they enhance the commercial viability and cost-competitiveness of these materials. Reactive extrusion is an attractive route for the copolymerization of 1,4-dioxan-2-one as well as its copolymerization, without solvents, to produce high molecular weight biodegradable plastics.

References cited and incorporated by reference in their entirety

| | |
|---|---|
| Snapp, H. et al. | U.S. Pat. No. 3,645,941 |
| Bezwada, R. et al. | U.S. Pat. No. 4,643,191 |
| Schultz, H. | U.S. Pat. No. 3,063,967 |
| Bagget, J. et al. | U.S. Pat. No. 3,391,126 |
| Doddi, N. et al. | U.S. Pat. No. 4,032,988 |
| Forschner; T. | U.S. Pat. No. 5,717,059 |
| Forschner, T. et al. | U.S. Pat. No. 5,652,331 |
| Bastioli, C. et al. | U.S. Pat. No. 5,412,005 |
| Narayan R. et al | U.S. Pat. No. 5,801,224 |
| Narayan, R. et al. | U.S. Pat. No. 5,906,783 |
| Narayan, R. et al. | U.S. Pat. No. 5,969,089 |
| Fritz, H. et al. | U.S. Pat. No. 6,166,169 |

Articles:

Kricheldorf, H. Macromol. Symp. 130: 393 (1998)
Nishida, H. at al. J. Polymer Science: Part A: Polymer Chemistry 38: 1560 (2000)
Michaeli, W. et al., J. of Appl. Polymer Sci. 48: 871-886 (1993)
Kye, H., et al., J. of Appl. Polymer Sci. 52: 1249-1262 (1994)

OBJECTS OF THE INVENTION

It is therefore an object of the present invention to provide a process for the bulk copolymerization of 1,4-dioxan-2-one and a cyclic ester via a coordination-insertion mechanism using catalysts and/or initiators, to form a high molecular weight polymer. Specifically, it is an object of the invention to provide an extrusion process for the copolymerization of 1,4-dioxan-2-one and a cyclic ester using coordination-insertion catalysts and initiators such as aluminum alkoxides.

SUMMARY OF THE INVENTION

The present invention relates to a process wherein the copolymerization of 1,4-dioxan-2-one, using a coordination-insertion catalyst, is conducted with a limited amount (20 mole percent or less based upon 1,4-dioxane-2-one) of cyclic ester to form high molecular weight, and with conversion in unreacted 1,4-dioxane-2-one monomer of less than 3 wt %. Specifically, the comonomer includes lactones like ε-caprolactone, δ-valerolactone, β-butyrolactone and γ-butyrolactone or dilactone like lactide and glycolide. As used herein, "poly(1,4-dioxan-2-one)" shall refer to polymers comprising 1,4-dioxan-2-one units with up to about 40 mole percent other cyclic ester units.

The present invention also relates to the manufacture of semi-crystalline poly(1,4-dioxan-2-one) and cyclic ester copolymers with good thermal properties and improved thermal stability. Specifically, the present invention relates to prevent depolymerization reactions, both during the polymerization process as well as during subsequent treatments of the melt. The present invention also relates to composition derived by reactive extrusion polymerization process, which are useful in making biodegradable articles, and preferentially relates to a unique intermediate polymer that exhibits chain branching.

The present invention thus relates to a process for forming poly(1,4-dioxan-2-one) copolymer with a cyclic ester monomer, the improvement, which comprises: (i) providing a reactant mixture comprising 1,4-dioxan-2-one and a cyclic ester monomer each containing less than 100-ppm water and having an acid value less than 0.5 mg KOH/g, and an organometallic polymerization agent into a blending means, in the absence of a solvent; and (ii) blending the reactant mixture at a temperature between about 80° and 240° C. to form the poly(1,4-dioxan-2-one).

The present invention also relates to a process for forming poly(1,4-dioxan-2-one) and cyclic ester monomer copolymer, which comprises: (i) introducing a reactant mixture comprising 1,4-dioxan-2-one containing less than 100-ppm water and having an acid value less than 0.5 mg KOH/g, and a cyclic ester monomer containing less than 100-ppm water and having an acid value less than 0.5 mg KOH/g, and an organometallic polymerization agent into an extruder, in the absence of a solvent; and (ii) extruding the reactant mixture at a temperature between about 80° and 240° C. to form the poly(1,4-dioxan-2-one) cyclic ester monomer copolymer.

The present invention further relates to a process for forming a poly(1,4-dioxan-2-one) and cyclic ester copolymer blended with additional ingredients, which comprises: (i) introducing a reactant mixture comprising 1,4-dioxan-2-one and a cyclic ester monomer each containing less than 100-ppm water and having an acid value less than 0.5 mg KOH/g, and an organometallic polymerization agent into an extruder, in the absence of a solvent; (ii) blending the reactant mixture at a temperature between about 80° and 240° C. to form the poly(1,4-dioxan-2-one) and cyclic ester copolymer; and (ii) admixing additional ingredients to the poly(1,4-dioxan-2-one) and cyclic ester copolymer selected from the group consisting of polymers, fillers and plasticizers.

The present invention also relates to an anhydrous poly (1,4-dioxan-2-one) copolymer with a cyclic ester monomer comprised of a structure formula:

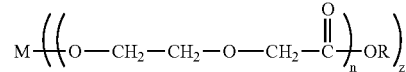

wherein M is a metal selected from the group consisting of tin, titanium, zinc, aluminum, zirconium, and samarium and mixtures thereof; z is an integer between 1 and 4 representing a number of arms on M, attached to M; n is a number related to the degree of polymerization, which is between about zero and 2000 and which may be different for each arm, z; and R is selected from the group consisting of hydrogen, alkyls and substituted alkyls containing 1 to 18 carbon atoms, wherein the copolymer contains less than 5% of the polymerized cyclic ester monomer.

Furthermore, the anhydrous poly(1,4-dioxan-2-one) (co) polymer intermediate can contain up to 20 mol % unit of cyclic ester. Specifically, the present invention relates to a process to synthesize high molecular weight 1,4-dioxan-2-one by ring-opening polymerization using an organometallic polymerization agent, wherein the polymerization is conducted in the absence of solvent for the monomer, and an extruder or similar equipment is used for the polymerization, and wherein the polymerization agents function by coordination-insertion mechanism. Specifically, the present invention relates to a reactive extrusion process to synthesize high molecular weight poly(1,4-dioxan-2-one) copolymers using catalysts and initiators like aluminum alkoxides that have been used as is or derived in situ from alkyl aluminum. Specifically, the present invention relates to a reactive extrusion process to synthesize high molecular weight and thermal stabilized aliphatic polyesters by polymerization of 1,4-dioxan-2-one copolymerized with a limited amount of cyclic ester using catalysts and initiators like aluminum alkoxides that have been used as is or derived in situ from alkyl aluminum. To prepare high molecular weight polymer, it is desirable to use 1,4-dioxan-2-one monomer, which has a high purity of at least about 98%. Such purity can generally be achieved by distillation of impurities from the monomer.

BRIEF DESCRIPTION OF THE DRAWINGS

FIG. 1 is a schematic front view of a screw configuration as described herein.

FIG. 2 is a schematic front view of an extruder as described herein.

FIG. 3 is a drawing of a drying setup as described herein.

DESCRIPTION OF PREFERRED EMBODIMENTS

Trace amounts of water and free acid in the monomer were unexpectedly found to affect the kinetics of the reactive extrusion polymerization. It is hence important to this invention that the 1,4-dioxan-2-one and cyclic ester contain less than 100-ppm water by weight. It is a preferred embodiment of the invention that the 1,4-dioxan-2-one and/or cyclic ester also have an acid value less than 0.5 mg KOH/g, and preferably less than 0.2 mg KOH/g. 1,4-Dioxan-2-one or cyclic ester was dried using molecular sieves by a setup shown in FIG. 3. FIG. 3 shows a system for drying of a monomer. Wet monomer is introduced via the neck in a previously nitrogen-purged round-bottom flask under nitrogen. The peristaltic pump supplied the monomer via the line through a column filled with molecular sieves. The monomer is extracted from unexpected dusts from molecular sieves using the filter, and returned to the round-bottom flask via the line. The drying step is cyclically performed for at least 72 hours. Specifically, 1,4-dioxan-2-one is heated above its melting point close to 28° C. during this drying step. The preferred molecular sieve is Type 3 A from Aldrich, USA.

The polymers are optionally blended and grafted with secondary components that are useful in making polymer, resin, specifically biodegradable articles, and more specifically biodegradable films. These biodegradable compositions derived from the aforementioned novel processes may be used as is or be subsequently admixed with other components like fillers, additives and other polymers. Specifically, the present invention relates to biodegradable compositions based on poly(1,4-dioxan-2-one) copolymerized with a limited amount of cyclic ester as derived by aforementioned polymerization process. Specifically, the present invention provides macromolecular designs including linear, star, dendrimer, graft structures, and more preferentially, branch structures based on poly(1,4-dioxan-2-one) copolymerized with a limited amount of cyclic ester copolymer as derived by aforementioned polymerization process. Specifically, the present invention relates to biodegradable compositions based on poly(1,4-dioxan-2-one) copolymerized with a limited amount of cyclic ester as derived by aforementioned polymerization process with other components like fillers, plasticizers, additives and other polymers, wherein these are preferably selected from the group consisting starch, modified or not, copolymer of maleic anhydride and polycaprolactone, ethylene-vinyl acetate copolymer, poly (vinyl alcohol), ethylene vinyl alcohol copolymer, polylactide, organic peroxide, and a mixture of peroxide and maleic anhydride.

The components of the reaction mixture that are employed in the process that is within the scope of this invention, derive compositions which include the following:
(I) cyclic ester copolymerized with 1,4-dioxan-2-one, containing a high purity of at least about 98%, and less than 50-ppm water that polymerize to form high molecular weight, and
(II) the polymerizing agent (catalyst and/or initiator), such as Lewis acid catalyst, metal alkyl, metal alkoxides and mixtures of these to catalyze or initiate polymerization of 1,4-dioxan-2-one copolymerized with a cyclic ester, as in (I), in the range of 0.001 to 5% by weight of the total reaction mixture.

1,4-Dioxan-2-one, as outlined in (I) above, which is to be copolymerized to form high molecular weight polymer contains less than 2% impurities. This level of impurities can be achieved by distillation of crude 1,4-dioxan-2-one monomer. 1,4-dioxan-2-one, which is to be polymerized to form high molecular weight polymer, also contains less than 100-ppm water and having an acid value less than 0.5 mg KOH/g, and preferably less than 0.2 mg KOH/g. The presence of water and free acid in the reactant mixture has a deleterious effect on the kinetics, and ultimately leads to lower conversion of monomer to polymer in the synthesis of high molecular weight poly(1,4-dioxan-2-one) polymer or high molecular weight copolymer based on 1,4-dioxan-2-one by reactive extrusion polymerization. It has been observed that these impurities interact with the polymerization catalyst or the propagating species, and lower the overall rate of polymerization. In cases where both monomers contain greater amounts than 100-ppm water, the desired water content may be achieved by any of the drying techniques known in the art, the preferred method being the use of molecular sieves (physical method) or calcium hydride (chemical method). The extent of free acid in the reactant varies according to the purity of the monomer grades available.

The choice of the type and amount of the polymerizable cyclic ester, as outlined in (I) above, is based on biodegradability, compatibility considerations, molecular weight, melt viscosity, mechanical and thermal properties, processability, hydrophobicity and cost. The more important amongst these are biodegradability, hydrophobicity, mechanical and thermal properties and compatibility considerations.

In accordance with the invention, the cyclic ester of choice are non-substituted lactones like ε-caprolactone, δ-valerolactone, β-propiolactone, γ-butyrolactone, substituted lactones like β-butyrolactone, β-valerolactone, and the like, lactides, glycolide, cyclic anhydrides such as adipic anhydride, and cyclic carbonates. It is preferred that the incorporation of a limited amount of cyclic ester enhances the thermal stability of poly(1,4-dioxan-2-one) chains. In particular, the incorporation of cyclic ester either random or sequential and/or both, prevents depolymerization reactions both during the polymerization process as well as during subsequent treatment of the melt. It is preferred that the incorporation of cyclic ester increases the monomer-to-polymer conversion. It is also preferred that the incorporation of cyclic ester does not alter the semi-crystallinity of poly(1,4-dioxan-2-one) polymer. Specifically, it is preferred that the melting point of the copolymer be close to that of homopoly(1,4-dioxan-2-one). It is further preferred that the incorporation of cyclic ester leads to an internal plasticization. The term internal plasticization is used when 1,4-dioxan-2-one is copolymerized with cyclic ester whose homopolymer has a glass transition temperature (Tg) lower than that of poly(1,4-dioxan-2-one). One of these advantages of internal plasticization is the increase in the range of application temperatures. The preferred monomers within the scope of this invention that are to be polymerized are ε-caprolactone and δ-valerolactone. It is further preferred that ε-caprolactone and δ-valerolactone be, ranging between 1 and preferably ranging between 5 and 20 mole percent of the total amount of 1,4-dioxan-2-one and cyclic ester monomer in the reaction mixture.

Two classes of catalyst/initiator are preferred to carry out the aforementioned polymerization of 1,4-dioxan-2-one or 1,4-dioxan-2-one/cyclic ester, as outlined in (II) above; one being Lewis acid catalysts such as Ti, Zn, and Sn salts more preferably stannous octoate (stannous 2-ethyl hexanoate) and the second being metal alkoxides like titanium tetrabutoxide, aluminum tri sec-butoxide, and aluminum isopropoxide. Metal alkoxides as is, and metal alkoxides generated in situ by coupling of metal alkyls with functionals discussed above are the preferred polymerization agents. Metal alkoxides are represented as $M(OR)_x$ where M=Al, Ti, Zn, Zr, Sn and the like, and x is 1 to 4. Metal alkyls are represented as $M(Alk)_y$ where Alk=alkyl radical, linear or branched, substituted or not, with 1 to 18 carbon atoms and y is 1 to 4. Dimers, trimers, tetramers, chelates and complexes of metal alkoxides and metal alkyls are also included as organometallic polymerization agents that are within the scope of the invention. Aluminum isopropoxide, aluminum tri-sec butoxide, alkoxides generated in situ by using tri ethyl aluminum or di-isobutyl aluminum hydride, and mixtures thereof are the most preferred initiators for the bulk polymerization of 1,4-dioxan-2-one or 1,4-dioxan-2-one copolymerized with a limited amount of cyclic ester, within the scope of the invention. It is preferred that the amount of such polymerization initiators/catalysts is at least about 0.001% by weight of the reaction mixture.

A schematic of the extruder is depicted in FIG. 2. In a nitrogen atmosphere, previously melted 1,4-dioxan-2-one (component I) was introduced into the feed throat of a twin-screw extruder (such as Baker Perkins co-rotating twin screw extruder-MPC/V-30) at a feed rate of 2-20 lb/hr by means of a pump. Alternatively, 1,4-dioxan-2-one can be introduced by means of solid metering at a feed rate of 2-20 lb/hr. The extruder screw speed was 20-300 rpm, preferably 30-150 rpm, and the extrusion temperature was between 80° C. and 230° C., preferably between 100 and 170° C., wherein the extruder was also under nitrogen gas blanketing. A cyclic ester such as ε-caprolactone was added downstream (away from the feed throat) or admixed with 1,4-dioxan-2-one (component II) and/or introduced as separate streams in the feed throat. The cyclic ester was separately metered by a pump at a feed rate of 0.5-5 lb/h in a nitrogen atmosphere. The appropriate polymerization agent (component III) was separately metered by a pump. Both components (component I/II or I/II/III) were introduced as separate streams into the feed throat. Furthermore, both feed streams (component I/II or I/II/III) can be mixed in a pre-mixer, heated or not, and then be introduced in the feed throat. A die was used to extrude the polymer product. Downstream from the feed throat, other feed section may be provided for optional additives like plasticizers, fillers, reaction terminators or other additives.

The extruder conditions were set to control the polymerization temperature to be at least 80° C., preferably with residence times up to 12 minutes. The choice of appropriate screw configurations in the extruder is chosen to provide complete conversion of monomer, high molecular weight, favorable kinetics, and control over the resulting molecular weight. For example, it has been shown that the use of high shear zones is beneficial in molecular weight of nylon. However, it is not the case of ε-caprolactone polymerization for which a high shear process results in heat generation leading to side reactions that give a loss in molecular weight (U.S. Pat. Nos. 5,969,089 and 5,906,783). FIG. 1 shows the preferred screw configuration for the bulk (co)polymerization of 1,4-dioxan-2-one that was employed close to that used for bulk polymerization of ε-caprolactone. The screw configuration is entirely made up of conveying screw elements, which ensures near plug flow conditions with minimal back mixing.

The process scheme outlined above is used to derive polymer compositions, especially biodegradable compositions like pellets, films, sheets, molding, foams, and fibers starting from poly (1,4-dioxan-2-one), as a copolymer with a cyclic ester, more particularly, a copolymer from 1,4-dioxan-2-one and ε-caprolactone. The molecular weight depends upon the desired application but will typically range from about 50,000 to about 300,000 for each arm.

The following equation represents the evolution of the resulting branched structure from the (co)polymerization of 1,4-dioxan-2-one with up to 4 arms (depending upon the metal) or more depending on the polymerization agent as derived by bulk (co)polymerization of 1,4-dioxan-2-one via a coordination-insertion mechanism in an extruder. On the account of the branched nature of polymer, high molecular weight compositions with high melt viscosities and good melt processing characteristics were easily synthesized.

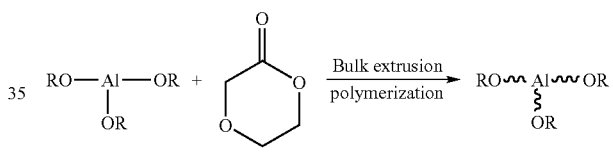

Blends of the reactive extruded poly(1,4-dioxan-2-one) copolymers, preferably branched, with other polymers, plasticizers and fillers are also included within the scope of this invention. Such a blend composition using the aforementioned aliphatic (co)polyester obtained by ring-opening polymerization comprises one or more of the following:

(A) optionally, other polymers, including those based on lactones, lactides, and glycolide, substituted or not, polyorthoesters, polymers and copolymers of hydroxybutyrate and hydroxyvalerate, poly(alkylene d-tartrate), vinyl polymers like poly (vinyl alcohol), poly (vinyl acetate), ethylene vinyl alcohol copolymer, ethylene-vinyl acetate copolymer, polyanhydrides like polyadipic anhydride, polycarbonates, proteins, polysaccharides like starches and cellulosics including cellulose, cellulose acetate, cellulose butyrate, and cellulose propionate, lignocellulose, starch, starch esters and amylose esters, each of these being in a form that is granular, plasticized, destructurized, solvated or physically or chemically modified in any other way, copolyester amides, preferably based on caprolactone and caprolactam, polyolefins, polyurethanes, and mixtures thereof, each of these being hydrophobic or not, modified or not as in branched, cross-linked, copolymerized, functionalized, surface-modified, physically or chemically modified in other similar ways. The branching or cross-linking is conducted separately or in situ by a peroxide initiation; copolymers includes copolymers of lactones, lactides, and glycolide, substituted or not with each other and graft copolymers of lactones, lactides, and glycolide, substituted or not with various functional monomers like maleic anhydride, stearic anhydride, ethylene oxide, aliphatic and aromatic isocyanates, and acrylic acid, wherein the grafting of these functional monomers is conducted separately or in situ, preferably by peroxide initiated grafting in an extruder, and wherein the amount of grafted monomer is at least 0.1% with respect to the main polymer; functionalization of lactones, lactides, and glycolide, substituted or not related to end-capping these polymers with suitable functional groups like unsaturated groups, isocyanate groups and the like.

Of these, the preferred polymers are those that are biodegradable, such as those based on proteins, polysaccharides as described above, polymers of lactones, lactides, and glycolide, substituted or not, aliphatic polyesters, polyamides and polyester amides, and mixture thereof, each of these being hydrophobic or not, modified or not as in branched, cross-linked, copolymerized, functionalized, surface-modified, physically or chemically modified in other similar ways. The preferred amount of these polymers in the final composition is in the range of 10 to 90% by weight, and (B) optionally, peroxides to cross-link the polyester and improve melt strength, in the amount of 0.1 to 2 part of peroxide per hundred parts of the polyester, and (C) optionally, fillers and reinforcements employed in plastics, in an amount up to 40% by weight of the composition.

The following non-limiting procedures and examples are used to further describe the invention and illustrate some of the highlights of the invention.

COMPARATIVE EXAMPLE 1

Reactive extrusion process for bulk polymerization of 1,4-dioxan-2-one monomer using Aluminum Tri-sec Butoxide (aluminum alkoxide)

The polymerization of 1,4-dioxan-2-one monomer using aluminum tri-sec butoxide (aluminum alkoxides) by a coordination insertion mechanism via reactive extrusion is described. 1,4-dioxan-2-one was dried over 3 Angstrom molecular sieves prior to being introduced in the extruder as shown in FIG. 2. A 5-wt % solution of aluminum tri-sec butoxide in dry toluene was prepared in a nitrogen atmosphere. A Baker Perkins co-rotating twin-screw extruder (with the screw configuration of FIG. 1) was used for the polymerization process and was set to a barrel temperature of 130° C. Monomer and catalysts solutions were introduced as separate streams in the feed throat of the extruder using a peristaltic pump. The previously melted monomer feed was 23.23 g/min. The polymerization agent feed rate was 0.405 g/min corresponding to a theoretical molecular weight of 94,550 for each arm. The extruder screw speed used was 130 rpm resulting in a mean residence time greater than 1 min. The extrudate was cooled down to room temperature. The polymer was recovered by hot solubilization of crude polymerizing mixture in 1,1,2,2-tetrachloroethane, precipitation into 7 volumes of heptane, filtration and drying until a constant weight. The conversion was 65% as determined by gravimetry, and the intrinsic viscosity was 0.77 dl/g as determined by viscosimetry in 1,1,2,2-tetrachloroethane/phenol (3:2 in volume) at 25° C. This limited conversion is in perfect agreement with the expected value based on the monomer/polymer theoretical equilibrium (about 34% monomer in equilibrium).

EXAMPLE 2

Reactive extrusion process for bulk copolymerization of 1,4-dioxan-2-one monomer with an imposed molar fraction in ϵ-caprolactone of 0.08 using Aluminum Tri-sec Butoxide (aluminum alkoxide)

The polymerization of 1,4-dioxan-2-one monomer using aluminum tri-sec butoxide (aluminum alkoxides) by a coordination insertion mechanism via reactive extrusion is described. 1,4-dioxan-2-one and ϵ-caprolactone were dried over 3 Angstrom molecular sieves prior to being introduced in the extruder as shown in FIG. 3. A 5-wt % solution of aluminum tri-sec butoxide in dry toluene was prepared in a nitrogen atmosphere. A Baker Perkins co-rotating twin-screw extruder (with the screw configuration of FIG. 1) was used for the polymerization process and was set to a barrel temperature of 130° C. Monomers and catalyst solutions were introduced as separate streams in the feed throat of the extruder using peristaltic pumps. The previously melted 1,4-dioxan-2-one feed rate was 23.23 g/min. The feed rate of ϵ-caprolactone was 2.37 g/min. The polymerization agent feed rate was 0.405 g/min corresponding to a theoretical molecular weight of 104,200 for each arm. The extruder screw speed used was 130 rpm resulting in a mean residence time greater than 1 min. The extrudate was cooled down to room temperature. The conversion was 99% (cf. Example 1), and the intrinsic viscosity was 0.65 dl/g as determined by viscosimetry in 1,1,2,2-tetrachloroethane/phenol (3:2 in volume) at 25° C. The exact molar fraction of ϵ-caprolactone was 0.11 as determined in $C_2D_2Cl_4$ by $^1H$ NMR (300 MHz).

EXAMPLE 3

Reactive extrusion process for bulk copolymerization of 1,4-dioxan-2-one monomer with an imposed molar fraction in ϵ-caprolactone of 0.11 using Aluminum Tri-sec Butoxide (aluminum alkoxide)

The polymerization of 1,4-dioxan-2-one monomer using aluminum tri-sec butoxide (aluminum alkoxides) by a coordination insertion mechanism via reactive extrusion is described. 1,4-dioxan-2-one and ϵ-caprolactone were dried over 3 Angstrom molecular sieves prior to being introduced in the extruder as shown in FIG. 3. A 5-wt % solution of aluminum tri-sec butoxide in dry toluene was prepared in a nitrogen atmosphere. A Baker Perkins co-rotating twin-screw extruder (with the screw configuration of FIG. 1) was used for the polymerization process and was set to a barrel temperature of 130° C. Monomer and catalyst solutions were introduced as separate streams in the feed throat of the extruder using peristaltic pumps. The previously melted 1,4-dioxan-2-one feed rate was 23.23 g/min. The feed rate of ϵ-caprolactone was 3.29 g/min. The polymerization agent feed rate was 0.405 g/min corresponding to a theoretical molecular weight of 107,950 for each arm. The extruder screw speed used was 130 rpm resulting in a mean residence time greater than 1 min. The extrudate was cooled down to room temperature. The conversion was 97% (of. Example 1), and the intrinsic viscosity was 0.55 dl/g as determined by viscosimetry in 1,1,2,2-tetrachloroethane/phenol (3:2 in volume) at 25° C. The exact molar fraction of ε-caprolactone was 0.16 as determined in $C_2D_2Cl_4$ by $^1H$ NMR (300 MHz).

EXAMPLE 4

Reactive extrusion process for bulk copolymerization of 1,4-dioxan-2-one monomer with an imposed molar fraction in ε-caprolactone of 0.16 using Aluminum Tri-sec Butoxide (aluminum alkoxide)

The polymerization of 1,4-dioxan-2-one monomer using aluminum tri-sec butoxide (aluminum alkoxides) by a coordination insertion mechanism via reactive extrusion is described. 1,4-dioxan-2-one and ε-caprolactone were dried over 3 Angstrom molecular sieves prior to being introduced in the extruder as shown in FIG. 3. A 5-wt % solution of aluminum tri-sec butoxide in dry toluene was prepared in a nitrogen atmosphere. A Baker Perkins co-rotating twin-screw extruder (with the screw configuration of FIG. 1) was used for the polymerization process and was set to a barrel temperature of 130° C. Monomer and catalysts solutions were introduced as separate streams in the feed throat of the extruder using peristaltic pumps. The previously melted 1,4-dioxan-2-one feed rate was 23.23 g/min. The feed rate of ε-caprolactone was 5.18 g/min. The polymerization agent feed rate was 0.602 g/min corresponding to a theoretical molecular weight of 77,550 for each arm. The extruder screw speed used was 130 rpm resulting in a mean residence time greater than 1 min. The extrudate was cooled down to room temperature. The conversion was 99%, and the intrinsic viscosity was 0.38 dl/g as determined by viscosimetry in 1,1,2,2-tetrachloroethane/phenol (3:2 in volume) at 25° C. The exact molar fraction of ε-caprolactone was 0.24 as determined in $C_2D_2Cl_4$ by $^1H$ NMR (300 MHz).

Comparison of Example 1 to Examples 2, 3 and 4 demonstrates the beneficial effect of using relatively small amounts of ε-caprolactone monomer in achieving complete conversion of monomer to high molecular weight polymer in a short residence time.

EXAMPLE 5

Dependency of weight loss on the composition of ε-caprolactone into 1,4-dioxan-2-one (co)polymer Isothermal thermogravimetric analyses were taken using 1,4-dioxan-2-one copolymer (Examples 2,3,4) compared to 1,4-dioxan-2-one homopolymer (Example 1), which were extracted from aluminum residues. The aluminum residues were extracted by successively washing the organic layer with an aqueous solution of EDTA (0.1 M) and using deionized water twice. The time-dependence of weight loss was performed at 180° C. under helium atmosphere (Table 1).

TABLE 1

Effect of ε-caprolactone content on time-dependence of weight loss of poly(1,4-dioxan-2-one) (co)polymers after catalyst extraction at 180° C. under helium flow:

| Entry | Composition [a] | Intrinsic viscosities [b] (dl/g) | Weight loss after 20 min in isothermal | Weight loss after 40 min in isothermal | Weight loss after 60 min in isothermal |
|---|---|---|---|---|---|
| 1 | 1,4-dioxan-2-one homopolymer | 0.77 | 4% | 8% | 11% |
| 2 | 11 mol % ε-caprolactone -co- 89 mol % 1,4-dioxan-2-one copolymer | 0.65 | 1.5% | 4% | 6% |
| 3 | 16 mol % ε-caprolactone -co- 84 mol % 1,4-dioxan-2-one copolymer | 0.55 | 1.5% | 2.5% | 4.5% |
| 4 | 24 mol % ε-caprolactone -co- 76 mol % 1,4-dioxan-2-one copolymer | 0.38 | 1% | 2.5% | 4.5% |

[a] As determined in $C_2D_2Cl_4$ by $^1H$ NMR (300 MHz)
[b] As determined by viscosimetry in 1,1,2,2-tetrachloroethane/phenol (3:2 in volume) at 25° C.

The incorporation of ε-caprolactone into poly(1,4-dioxan-2-one) chains brings an increase in thermal stability (entry 1, 2, 3 and 4). This beneficial thermostabilizing effect increasing with the molar fraction of ε-caprolactone prevents the occurrence of depolymerization reactions.

EXAMPLE 6

Thermal transition of 1,4-dioxan-2-one (co)polymers from Examples 1, 2, 3 and 4

Table 2 shows the thermal properties of 1,4-dioxan-2-one (co)polymers extracted from aluminum residues (cf. Example 5). The DSC thermograms were obtained by a heating scan of 10° C./min from −100° C. to 140° C. under helium flow ($2^{nd}$ scan).

TABLE 2

Effect of ε-caprolactone content on thermal properties of poly(1,4-dioxan-2-one) (co)polymers

| Entry | Composition [a] | Intrinsic viscosities [b] (dl/g) | Tg [c] (° C.) | Tm [d] (° C.) | ΔHm [e] (J/g) |
|---|---|---|---|---|---|
| 1 | 1,4-dioxan-2-one homopolymer | 0.77 | −11 | 106 | 69 |
| 2 | 11 mol % ε-caprolactone -co- 89 mol % 1,4-dioxan-2-one copolymer | 0.65 | −22 | 94 | 56 |
| 3 | 16 mol % ε-caprolactone -co- 84 mol % 1,4-dioxan-2-one copolymer | 0.55 | −23 | 85 | 48 |
| 4 | 24 mol % ε-caprolactone -co- 76 mol % 1,4-dioxan-2-one copolymer | 0.38 | −29 | 68 | 32 |

[a] As determined in $C_2D_2Cl_4$ by $^1H$ NMR (300 MHz)
[b] As determined by viscosimetry in 1,1,2,2-tetrachloroethane/phenol (3:2 in volume) at 25° C.
[c] Glass transition temperature
[d] Melting temperature
[e] Melting enthalpy The incorporation of 11-mol % of ε-caprolactone into poly(1,4-dioxan-2-one) chains (Table 2, entry 2) does not alter the melting temperature with regard to the homopoly (1,4-dioxan-2-one) (Table 1, entry 1). Furthermore, an interesting internal plasticization effect increases the range in service temperatures from −11° C. to −22° C.

It is intended that the foregoing description be only illustrative of the present invention and that the present invention be limited only by the hereinafter appended claims.

We claim:

1. In a process for forming poly(1,4-dioxan-2-one) copolymer with a cyclic ester monomer, the improvement, which comprises: (i) providing a reactant mixture consisting essentially of 1,4-dioxan-2-one and a cyclic ester monomer in an amount of 20 mole percent or less based upon the 1,4-dioxan-2-one each containing less than 100-ppm water and having an acid value less than 0.5 mg KOH/g, and an organometallic polymerization agent selected from the group consisting of a metal alkoxide and a metal alkyl into a blending means, in the absence of a solvent; and (ii) blending the reactant mixture at a temperature between about 80° and 240° C. to form the poly(1,4-dioxan-2-one) branched from the metal, wherein less than 5 wt. percent of unreacted 1,4-dioxan-2-one is present in the copolymer.

2. The process of claim 1 wherein the acid value is less than 0.2 mg KOH/g.

3. The process of claim 1 wherein the agent is metal alkoxide and the metal is selected from the group consisting of Al, Ti, Zn, Zr and Sn.

4. The process of claims 1 or 2 wherein the agent is the metal alkoxide which is of the formula:

$M(OR)_x$ where M is the metal, R is an alkyl group containing 1 to 4 carbon atoms and x is 1 to 4.

5. The process of claims 1 or 2 wherein the agent is the metal alkyl of the formula:

$M(Alk)_y$ where Alk is an alkyl group, linear, branched or substituted with non-interfering groups containing 1 to 18 carbon atoms.

6. A process for forming poly(1,4-dioxan-2-one) and cyclic ester monomer copolymer, which comprises: (i) introducing a reactant mixture consisting essentially of 1,4-dioxan-2-one containing less than 100-ppm water and having an acid value less than 0.5 mg KOH/g, and a cyclic ester monomer in an amount of 20 mole percent or less based upon the 1,4-dioxan-2-one containing less than 100-ppm water and having an acid value less than 0.5 mg KOH/g, and an organometallic polymerization agent selected from the group consisting of a metal alkoxide and a metal alkyl into an extruder, in the absence of a solvent; and (ii) extruding the reactant mixture at a temperature between about 80° and 240° C. to form the poly(1,4-dioxan-2-one) and cyclic ester monomer copolymer branched from the metal, wherein less than 5 wt. percent of unreacted 1,4-dioxan-2-one is present in the copolymer.

7. The process of claim 6 wherein the acid value is less than 0.2 mg KOH/g.

8. The process of claims 6 or 7 wherein the agent is the metal alkoxide and the metal is selected from the group consisting of Al, Ti, Zn, Zr and Sn.

9. The process of claims 6 or 7 wherein the agent is the metal alkoxide of the formula:

$M(OR)_x$ where M is the metal, R is an alkyl group containing 1 to 4 carbon atoms and x is 1 to 4.

10. A process for forming a poly(1,4-dioxan-2-one) and cyclic ester copolymer blended with additional ingredients, which comprises: (i) introducing a reactant mixture comprising 1,4-dioxan-2-one and a cyclic ester monomer in an amount of 20 mole percent or less based upon the 1,4-dioxan-2-one each containing less than 100-ppm water and having an acid value less than 0.5 mg KOH/g, and an organometallic polymerization agent selected from the group consisting of a metal alkoxide and a metal alkyl into an extruder, in the absence of a solvent; (ii) blending the reactant mixture at a temperature between about 80° and 240° C. to form the poly(1,4-dioxan-2-one) and cyclic ester copolymer branched from the metal, wherein less than 5 wt. percent of unreacted 1,4-dioxan-2-one is present in the copolymer; and (ii) admixing additional ingredients to the poly(1,4-dioxan-2-one) and cyclic ester copolymer selected from the group consisting of polymers, fillers, plasticizers and mixtures thereof.

11. The process of claim 10 wherein the acid value is less than 0.2 mg KOH/g.

12. The process of claims 10 or 11 wherein the agent is the metal alkoxide and wherein the metal is selected from the group consisting of Al, Ti, Zn, Zr and Sn.

13. The process of claims 10 or 11 wherein the agent is the metal alkoxide of the formula:

$M(OR)_x$ where M is the metal, R is an alkyl group containing 1 to 4 carbon atoms and x is 1 to 4.

14. The process of claims 10 or 11 wherein the agent is the metal alkyl of the formula:

$M(Alk)_y$ where Alk is an alkyl group, linear, branched or substituted with non-interfering groups containing 1 to 18 carbon atoms.

15. The process of claim 6 or 10 wherein the cyclic ester monomer is a lactone.

16. The process of any one of claims 10, 11 or 12 wherein the ester monomer is selected from the group consisting of a non-substituted lactone, a substituted lactone, a lactide, a glycolide, a cyclic anhydride, a cyclic carbonate and mixtures thereof.

17. An anhydrous poly(1,4-dioxan-2-one) copolymer which comprises a reaction product, a copolymerized anhydrous 1,4-dioxan-2-one, and an anhydrous cyclic ester monomer in an amount of 20 mole percent or less based upon the 1,4-dioxan-2-one, and an organometallic polymerization agent selected from the group consisting of a metal alkoxide and a metal alkyl wherein the copolymer contains less than 5% of 1,4-dioxan-2-one and cyclic ester monomer, and wherein the copolymer is branched from the metal.

18. An anhydrous poly(1,4-dioxan-2-one) copolymer with a cyclic ester monomer comprised of a structure formula:

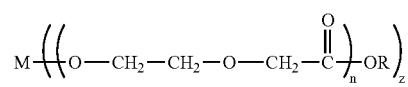

wherein M is a metal selected from the group consisting of tin, titanium, zinc, aluminum, zirconium, and samarium and mixtures thereof; z is an integer between 1 and 4 representing a number of arms on M, attached to M; n is a number related to the degree of polymerization, which is between about zero and 2000 and which may be different for each arm, z; and R is selected from the group consisting of hydrogen, alkyls and substituted alkyls containing 1 to 18 carbon atoms, wherein the copolymer contains less than 5% of the polymerized cyclic ester monomer.

19. The process of claims 2 or 3 wherein the copolymer is extruded and the metal is aluminum.

20. The process of claims 7 or 8 wherein the copolymer is extruded and the metal is aluminum.

\* \* \* \* \*